Dec. 10, 1957  F. O. HIGGINS  2,815,780
METHOD OF STRETCHING AND STRESS RELIEVING LUMBER
Filed Aug. 2, 1957  2 Sheets-Sheet 1

Frank O. Higgins
INVENTOR.

BY *Clarence A. O'Brien*
*and Harvey B. Jacobson*
Attorneys

Dec. 10, 1957      F. O. HIGGINS      2,815,780
METHOD OF STRETCHING AND STRESS RELIEVING LUMBER
Filed Aug. 2, 1957      2 Sheets—Sheet 2
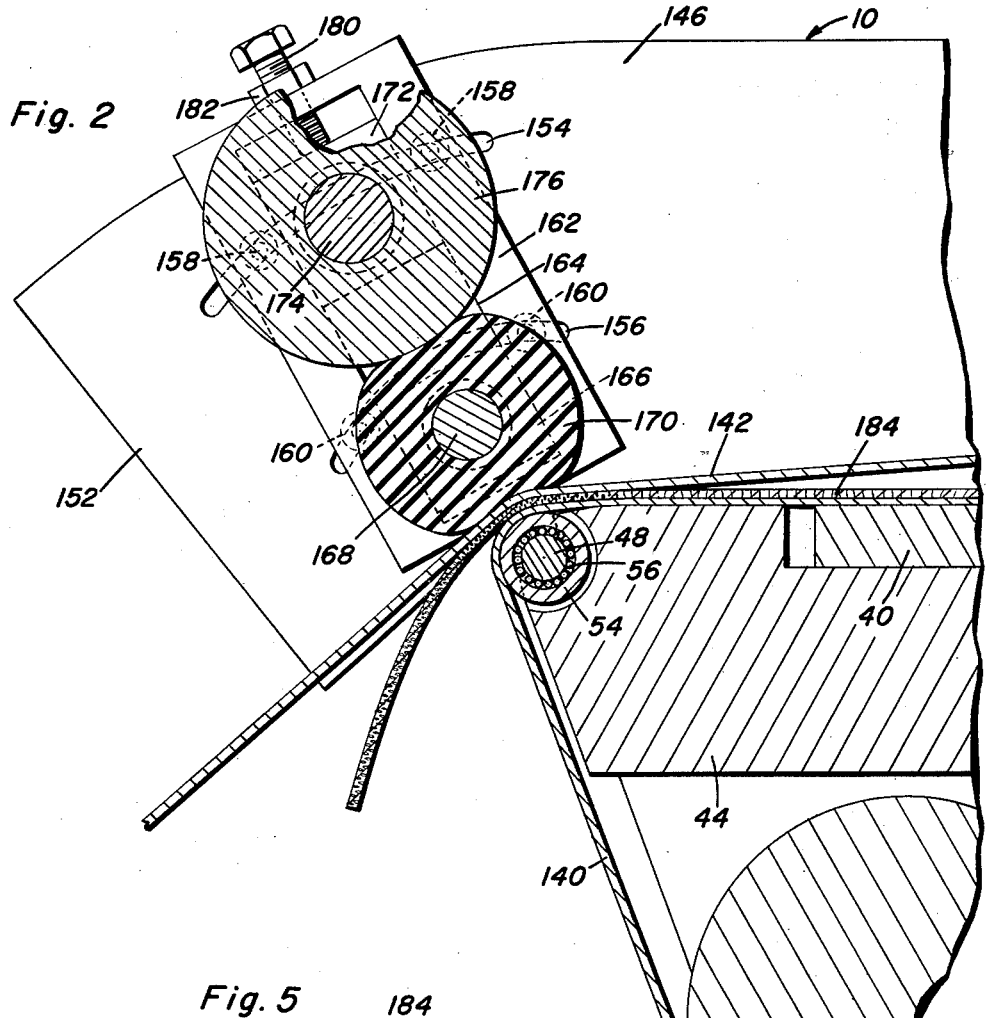
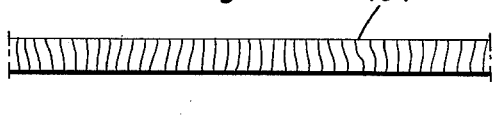
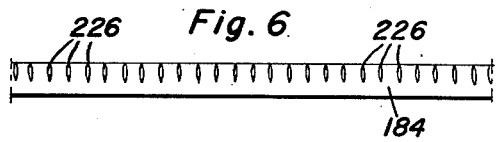
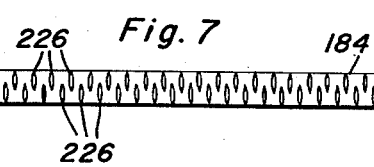
Frank O. Higgins
INVENTOR.

United States Patent Office 2,815,780
Patented Dec. 10, 1957

2,815,780

METHOD OF STRETCHING AND STRESS RELIEVING LUMBER

Frank O. Higgins, New Orleans, La., assignor to Higgins Industries, Inc., New Orleans, La., a corporation of Louisiana Application August 2, 1957, Serial No. 675,936

5 Claims. (Cl. 144—309)

This invention relates in general to new and useful improvements in the method of treating lumber to restrict expansion of the lumber due to the absorption of moisture, and more specifically to an improved method of stretching and stress relieving lumber.

This application is a continuation-in-part application based upon my application Serial No. 567,516, filed February 24, 1956.

It is a well known property of wood to absorb moisture and to swell or stretch upon the absorption of such moisture in a direction normal to the direction of the fibers of such wood. This is very undesirable in finished structures, particularly furniture and flooring because in many instances the wood is confined and the absorption of the moisture and the stretching of the wood due to such absorption results in the buckling of the wood. A common example of this is the ordinary house wherein the windows, doors and floors are formed of wood. During rainy weather the doors and windows swell to the extent that they will not function properly, but stick. The floors, while they do not buckle because they are normally sufficiently secured in place, also absorb moisture to such an extent that they attempt to buckle. In cases where a sufficient quantity of moisture is present, the floors themselves will buckle irrespective of how they are secured in place.

At the present time there is used a large quantity of block flooring. This block flooring is normally of a laminated construction and is of three ply. Only the upper ply is used as a wearing surface and the other two plies are used for the purpose of reinforcing the upper ply. Since only the upper ply is used as a wearing surface, if the upper ply could be made of such a nature whereby it would resist buckling due to the absorption of moisture, then the necessity for the two lower plies would be eliminated and a great saving of wood would result.

It is therefore the primary object of this invention to provide an improved method of processing lumber, particularly wood veneer, whereby the lumber, after being treated, has been stretched normal to the line of the grain to the extent that when the veneer is later confined and secured in place in the normal manner, it may absorb a maximum amount of moisture without stretching excessively and thereby the tendency of the veneer to buckle is not such as to overcome the holding power of the means securing the veneer in place.

Another object of this invention is to provide an improved method of processing lumber, preferably veneer, wherein the individual fibers of the lumber are pulled apart to form expansion voids between the fibers in order that the individual fibers may have sufficient space through which to expand once they absorb moisture and swell, the veneer being stress relieved in the process whereby the tendency of the lumber to return to its original state is eliminated.

Still another object of this invention is to provide an improved method of processing lumber, the method including the steps of confining the lumber on opposite surfaces thereof and while confined progressively bending or otherwise tensioning one of the surfaces of the veneer so as to separate the bonds between adjacent fibers and partially break the connections therebetween with such separation and breakage being controlled due to the pressure contact on opposite surfaces of the lumber, and repeating the process on the same surface as the lumber and on the opposite sides thereof as is required to obtain a maximum stretching and flexibility of the lumber so that the lumber retains most of its strength and at the same time is pliable and resists buckling due to the absorption of moisture.

A further object of this invention is to provide an improved method of treating lumber so as to increase the flexibility of the lumber and internally compensate for the swelling of fibers of the lumber due to the absorption of moisture, the method including the steps of first permitting the lumber to soak in water until it has expanded a maximum due to the absorption of the water, after which the lumber is repeatedly treated on one side and then the other so as to pull apart under controlled tension the individual fibers of the lumber and partially break the connections between the fibers so that there are provided sufficient voids between the fibers for the expansion of the fibers upon the absorption of moisture by the fibers whereby when the lumber is edgewise confined, and secured in place in a normal manner, the tendency of the lumber to buckle is eliminated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged fragmentary sectional view taken through the main working portion of the machine and shows the specific relationship between the components of the machine which confine and bend a veneer, there being illustrated a veneer in the process of being confined and bent;

Figure 5 is a fragmentary enlarged transverse sectional view taken through the veneer prior to the treatment thereof in accordance with the method which is the subject of this invention;

Figure 6 is an enlarged fragmentary sectional view similar to Figure 5 and shows the veneer as it appears after one pass through the machine in accordance with the present invention; and Figure 7 is an enlarged fragmentary sectional view similar to Figures 5 and 6 and shows the veneer as it appears after two passes through the machine, the veneer being treated on opposite surfaces thereof.

Figure 1:
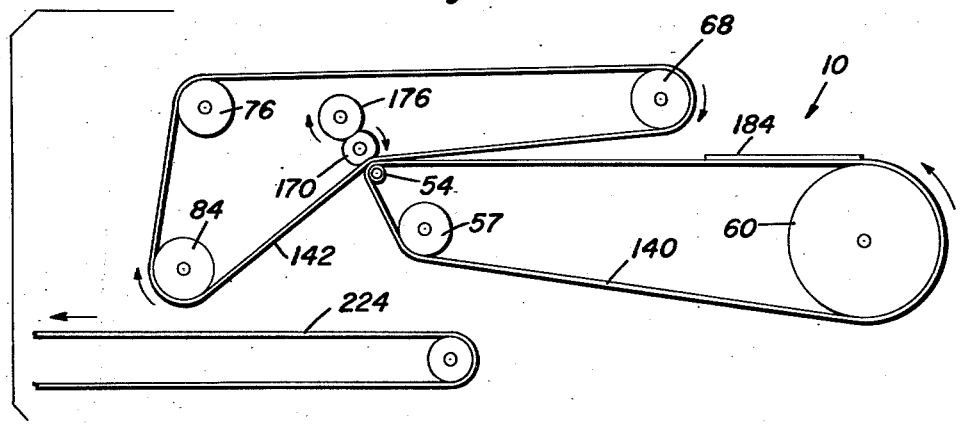
Figure 1 is a schematic view showing the arrangements of various components of the machine for processing the lumber, the machine being shown in detail in my application Serial No. 567,516.
Figure 3:
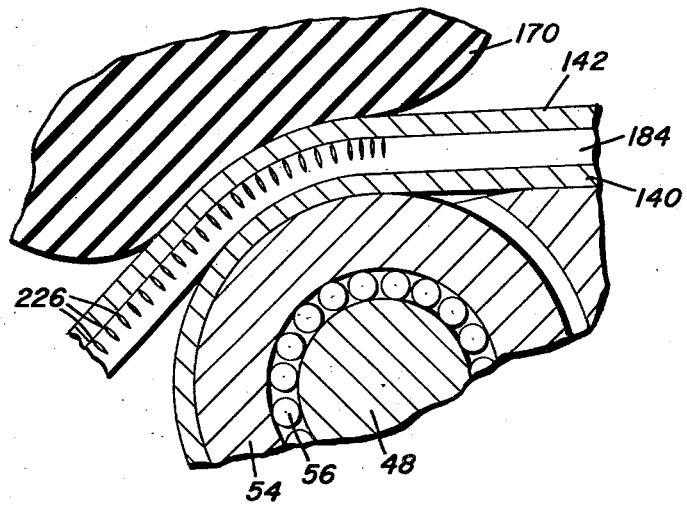
Figure 3 is an enlarged fragmentary sectional view taken through the veneer during the first step of stretching the veneer and shows the formation of voids therein.

Referring now to the drawings in detail, it will be seen that there is illustrated in Figures 1, 2, 3 and 4 fragmentary components of a machine for stretching and stress relieving lumber, which machine is referred to in general by the reference numeral 10 and which machine is fully disclosed in my application Serial No. 567,516. In order that the components of the machine which are pertinent to the present invention may be correlated with the machine as disclosed in my application Serial No. 567,516, the same reference numerals will be applied to the machine as are used in that application.

Referring now to Figure 1 in particular, it will be seen that the machine 10 includes a small diameter roller 54 about which veneer 184 to be treated is bent. The roller 54 may either be a continuous roller or in the form of a plurality of sectional rollers. Entrained over the roller 54 is a feed conveyor belt 140. The conveyor belt 140 also passes over an idler roller 57 which is disposed below and forwardly of the roller 54. The conveyor belt 140 also passes over a large conveyor roller 60 which will be considered the drive roller.

The machine 10 also includes a drive roller 68 which is disposed above and forwardly of the roller 54. Cooperating with the roller 68 are idler rollers 76 and 84, the idler roller 76 being disposed above and rearwardly of the roller 54 and the roller 84 being disposed below and rearwardly of the roller 54. Entrained over the rollers 68, 76 and 84 is a feed conveyor belt 142. The relationship of the rollers 68 and 84 is such that the conveyor belt 142 engages the conveyor belt 140 in the vicinity of the roller 54.

In order that the veneer 184 may be compressingly confined at the time it passes over the roller 54, there is provided a roller 170 which engages the conveyor belt 142 in opposed relation to the roller 54. The roller 170 is formed of rubber or other similar compressible resilient material. Engaged with the roller 170 is a roller 176 which is used for the purpose of exerting a pressure on the roller 170.

Disposed below the intersections of the conveyor belts 140 and 142 is a conveyor 224 for the reception of veneer 184 which has been treated in the machine 10.

Referring now to Figure 2 in particular, it will be seen that there is illustrated a portion of the machine 10 which includes a plate 40 over which the conveyor belt 140 passes in advance of the roller 54. Secured to the plate 40 in any desired manner is a support bar 44 which in turn carries a transverse shaft 48. The shaft 48 supports the roller or rollers 54 and suitable bearings 56 are mounted between the roller 54 and the shaft 48.

The machine 10 is provided at opposite sides thereof with plates 146 which terminate in downwardly curving rear portions 152. Only one of the plates 146 is shown. The rear portion 152 of each plate 146 is provided with an upper arcuate slot 154 and a lower slot 156, the slots 154 and 156 having the center of the shaft 48 as their common center. Adjustably received in the slots 154 and 156 are fasteners 158 and 160, respectively, which are threadedly engaged in a plate 162, there being one plate 162 for each plate 146. The fasteners 158 and 160 serve to adjustably secure the plate 162 to its respective plate 146 along the inner surface thereof.

Each of the plates 162 is provided with an elongated guideway 164 having an axis passing through the center of the shaft 48. Mounted within the lower portion of each of the guideways 164 is a bearing block 166. Extending between the bearing blocks 166 and journaled therein for rotation is a shaft 168 on which there is mounted the roller 170.

Mounted in the upper part of each guideway 164 is a bearing block 172. The bearing block 172 has journaled therein one end of a transverse shaft 174. The shaft 174 carries the roller 176.

As is best illustrated in Figure 2, the roller 176 compressibly engages the roller 170. In order that the pressure exerted on the roller 170 by the roller 176 may be varied, it is necessary that the bearing blocks 166 and 172 be adjustably positioned. This is accomplished by a setscrew 180 which extends down through the upper part of the plate 162 and engages the upper surface of the bearing block 174. The setscrew 180 is adjustable to accomplish the desired exertion of pressure and is retained in an adjusted position by means of a lock nut 182.

When the veneer 184 to be treated by the machine 10 is placed in the machine 10, the veneer 184 passes between the conveyor belts 140 and 142. The conveyor belt 140 passes over the roller 54 and conforms to the configuration thereof. The conveyor belt 142 passes around and under the roller 170 above the conveyor belt 140. Inasmuch as the roller 170 is formed of a compressible material, it conforms to the general outline of the roller 54. However, since the roller 170 is disposed further from the center of the shaft 48 than the outer surface of the roller 54, the radius of curvature thereof is greater than the radius of curvature of the outer surface of the roller 54.

By varying the pressure exerted upon the roller 170, the area of pressure between the roller 170, the conveyor belt 142 and the conveyor belt 140 may be varied. This area of pressure may be positioned as desired by swinging the plates 162 about the axis of the shaft 48 through the use of the slots 156 and 158. Further, the arc of pressure mentioned above may be varied by changing the material of the roller 170 or by increasing the diameter of the roller 170. Inasmuch as the conveyor belts 140 and 142 are disposed at different distances from the center of the shaft 48, it is readily apparent that they must travel at a slightly different rate of speed, the belt 142 moving faster than the belt 140, in order that they may travel at the same angular rate relative to the shaft 48. To accomplish this, the conveyor belts 140 and 142 are separately driven.

In the operation of the machine 10, the veneer 184 is laid upon the conveyor belt 140. The veneer 184 then passes in between the conveyor belt 140 and the conveyor belt 142. As it approaches the rollers 54 and 170, it becomes confined between the conveyor belts 140 and 142 and is then effectively gripped between the conveyor belts 140 and 142 by the pressure exerted thereon by the rollers 54 and 170. Then, as the veneer 184 further passes between the rollers 54 and 170, it remains in confinement and is bent about a relatively small radius, the radius being the radius of that portion of the conveyor belt 140 passing over the roller 54. As the veneer is progressively bent about the roller 54 in its confined state, the surface of the veneer remote from the roller 54 moves at a greater rate than the surface of the veneer adjacent the roller 54 and individual fibers of the veneer are progressively pulled apart a slight amount in the manner best shown in Figure 3. In the pulling apart of the fibers, the connections between the fibers are at least partially broken so that the veneer 184 after passing between the rollers 54 and 170 is stress relieved and the individual fibers are retained in their spaced relation. It is to be noted that the separation of the fibers do not extend entirely through the veneer 184. Because of this, the veneer has a tendency to curl. In order to further stretch the veneer and at the same time stress relieve the veneer 184, it is necessary that at least one more pass of the veneer 184 through the machine 10 or a similar machine is required in order to treat the opposite surface of the veneer 184.

It is readily apparent that the partially treated veneer 184 may either be turned over and again passed through the machine 184 or an identical machine 184 or may be passed through a machine similar to the machine 10 with the positions of the rollers 154 and 170 being transposed. On a simple basis the veneer could be repeatedly passed through the one machine 10. However, on a mass production basis, it is desired that a plurality of identical machines 10 be arranged in alignment and the veneer passed from one machine to the other with the veneer being inverted in between the machines. On the other hand, the machines 10 be alternated with inverted machines similar to the machine 10 so that the turning over or the inverting of the veneer 184 is eliminated.

Figure 4:
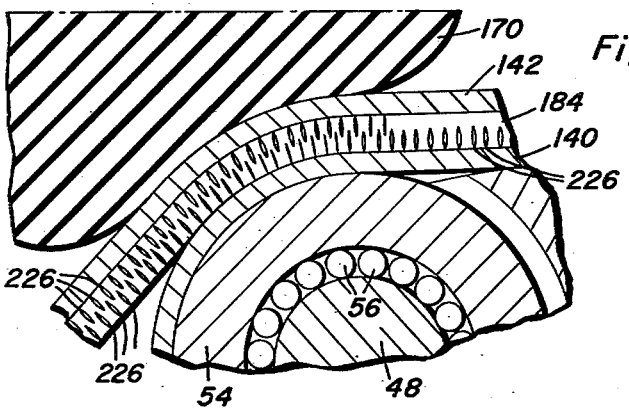
Figure 4 is an enlarged fragmentary sectional view similar to Figure 3 and shows the formation of voids in a veneer during a second pass through the machine, the opposite surface of the veneer being treated.

Referring now to Figures 4, 6 and 7 in particular, it will be seen that there is illustrated in Figure 5 the veneer 184 as it appears prior to treatment by the machine 10. After one pass through the machine 10, the veneer 184, as shown in Figure 6, has a plurality of voids 226 formed in the upper surface thereof. In Figure 7 the veneer 184 is illustrated after the lower surface of the veneer 184 has been treated so that additional voids 226 have been formed therein. It is to be noted that the voids 226 overlap adjacent the neutral axis of the veneer 184.

Although the veneer 184 has been described as only having a single pass through the machine 10 or a similar machine on each surface thereof, it is to be understood that as many additional passes through the machine 10 may be made to obtain the desired stretching and stress relieving of the veneer 184.

The veneer 184 may be passed between the rollers 54 and 170 either in a dry state or in a wet state. However, it is preferred that the veneer 184 be saturated with water so that it has swelled or expanded to a maximum. The fibers of the veneer 184 are then pulled further apart and stress relieved so that the tendency of the fibers to resume their original position is substantially eliminated whereby a dry veneer 184, after treatment with the machine 10, has a dimension transverse to the axis of the grain which is greater than the similar dimension of the veneer when completely saturated and expanded. Inasmuch as the stretched dimension of the veneer 184 is greater than the similar dimension of the veneer when completely saturated with water, complete saturation of the veneer 184, after being treated in accordance with the methods of this invention, will not cause buckling of the veneer even though the edges thereof are confined. Accordingly, the veneer 184 may be utilized in flooring construction and other similar situations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A process of stretching veneers and the like to increase the voids between individual fibers comprising the steps of first releasably engaging and pressure confining a veneer on opposite surfaces thereof and subsequently while pressure confined moving one of said surfaces in a direction normal to the fibers of the veneer and at a greater rate than the other of said surfaces to tension and pull apart individual ones of said fibers along said one surface and partially through the thickness of said veneer, and repeating the foregoing steps on the opposite surface of said veneer to pull apart other individual ones of said fibers along the opposite surface of said veneer.

2. A process of stretching veneers and the like to increase the voids between individual fibers of the veneer comprising the steps of first pressure confining a veneer on opposite surfaces thereof and subsequently while pressure confined moving one of said surfaces in a direction normal to the fibers at a greater rate than the other of said surfaces to tension and pull apart individual fibers of said veneer along said one surface and partially through the thickness of said veneer, and repeating the foregoing steps on the other surface of said veneer to pull apart others of the individual fibers along said other surface.

3. A process of stretching veneers and the like and stress relieving the veneers while stretched to prevent shrinkage comprising the steps of soaking said veneer to permit a maximum absorption of moisture in the veneer and the resultant stretching of said veneer in a direction normal to the fibers thereof, progressively confining opposite surfaces of the veneer along lines parallel to the fibers, and moving one of said surfaces at a greater rate than the other of said surfaces whereby the veneer is further stretched in a direction normal to the fibers and the connection between adjacent fibers are at least partially broken, releasing said veneer and repeating the confining and moving steps on the other surface of said veneer whereby the tendency of the fibers as a whole to contract when dried is eliminated and the individual fibers contract to leave voids therebetween.

4. A process of stretching veneers and the like to increase the voids between individual fibers comprising the steps of first releasably engaging and pressure confining a veneer on opposite surfaces thereof and subsequently while pressure confined progressively bending said veneer about a small radius in a direction normal ot the fibers and simultaneously tensioning and stressing and pulling apart individual fibers of said veneers along one surface and partially through the thickness of said veneer, and repeating the steps on the other surface of said veneer to pull apart other individual fibers along said other surface.

5. A process of stretching veneers and the like to increase the voids between individual fibers comprising the steps of first releasably engaging and pressure confining a veneer on opposite surfaces thereof and subsequently while pressure confined progressively bending said veneer about a small radius in a direction normal to the fibers and simultaneously tensionally stressing and pulling apart individual fibers of said veneer along one surface and partially through the thickness of said veneer, and turning over said veneer and repeating the foregoing steps to pull apart other individual fibers along said other surface.

References Cited in the file of this patent

UNITED STATES PATENTS

| | | |
|---|---|---|
| 1,778,250 | Elmendorf | Oct. 14, 1930 |
| 1,809,681 | Elmendorf | June 9, 1931 |
| 1,902,032 | Horine | Mar. 21, 1933 |
| 2,414,808 | Hamill | Jan. 28, 1947 |